United States Patent
Barnichon (10) Patent No.: US 7,773,151 B2
(45) Date of Patent: Aug. 10, 2010

(54) DEINTERLACING OF A SEQUENCE OF MOVING IMAGES

(75) Inventor: Christophe Barnichon, Sassenage (FR)

(73) Assignee: STMicroelectronics S.A., Montrouge (FR)

( * ) Notice: Subject to any disclaimer, the term of this patent is extended or adjusted under 35 U.S.C. 154(b) by 1122 days.

(21) Appl. No.: 11/404,575

(22) Filed: Apr. 14, 2006

(65) Prior Publication Data

US 2006/0256237 A1   Nov. 16, 2006

(30) Foreign Application Priority Data

Apr. 22, 2005   (FR) .................................. 05 04095

(51) Int. Cl.
*H04N 7/01* (2006.01)
(52) U.S. Cl. ...................... 348/448; 348/452; 348/445; 348/441; 382/300
(58) Field of Classification Search ................. 348/448, 348/445, 441, 451, 452, 911; 382/300
See application file for complete search history.

(56) References Cited

U.S. PATENT DOCUMENTS

| 5,886,745 | A | 3/1999 | Muraji et al. |
| 7,193,655 | B2 * | 3/2007 | Nicolas ...................... 348/448 |

FOREIGN PATENT DOCUMENTS

| EP | 1 267 575 A1 | 12/2002 |
| EP | 1 450 560 A2 | 8/2004 |
| WO | WO2005/072498 | 8/2005 |

OTHER PUBLICATIONS

French Preliminary Search Report dated Dec. 13, 2005 for French Application No. 0504095.

* cited by examiner

*Primary Examiner*—David L Ometz
*Assistant Examiner*—Jean W Désir
(74) *Attorney, Agent, or Firm*—Lisa K. Jorgenson; Jon A. Gibbons; Fleit Gibbons Gutman Bongini & Bianco P.L.

(57) ABSTRACT

A device and a method of deinterlacing a sequence of images from an interlaced format to a progressive format. The sequence of images being composed of successive frames. A plurality of pixels of missing lines of a current frame to be completed, an evaluation of the values of these pixels according to a spatially consistent order. The evaluation comprises, for each pixel of the plurality of pixels, estimating a direction of interpolation, spatial interpolation according to the estimated direction of interpolation. According to the invention, the estimation step comprises, for at least one current pixel of the plurality of pixels, calculating a score for at least two directions, and selecting the direction of interpolation on the basis of the calculated scores and of the estimated direction of interpolation for a distinct pixel situated in the neighborhood of the current pixel.

20 Claims, 5 Drawing Sheets

DEINTERLACING OF A SEQUENCE OF MOVING IMAGES

CROSS-REFERENCE TO RELATED APPLICATIONS

This application is based upon and claims priority from prior French Patent Application No. 05 04095, filed on Apr. 22, 2005 the entire disclosure of which is herein incorporated by reference.

FIELD OF THE INVENTION

The present invention relates generally to the conversion of video display and more particularly to deinterlacing by converting the interlaced format of frames of a sequence of images to the progressive display format.

BACKGROUND OF THE INVENTION

The format ordinarily used in television is termed the "interlaced video" format. The interlace video format is based upon a successive sequence of even lines followed by odd lines of an image. More specifically images are constructed from successive frames (half images) comprising frames having even pixel lines of a given image that are interlaced, i.e., alternated, with frames having only odd pixel lines of a following image. This halving of the amount of information in an interlace video format has the detrimental effect of reducing the quality of the images, and this is all the more noticeable when moving images are involved. Specifically, the image represented by a first frame is not quite the same as that represented by the following frame, since they are separated by an interval of time and the objects represented are in motion. The simple superposition of two successive frames therefore does not make it possible to reconstruct an image on the basis of a sequence of images in the interlaced video format. This simple superposition is possible only when the sequence of images is in the so-called film format (also known as "movie" format), for which each filmed image has been decomposed over two frames during encoding to the interlaced format.

Figure 1A:
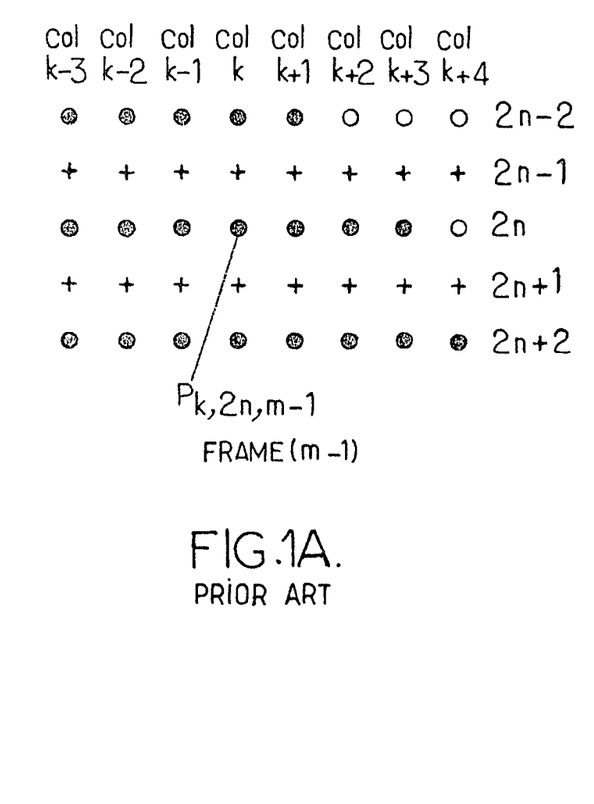
FIGS. 1A and 1B, already commented on, represent two examples of portions of successive frames of the prior art.
Figure 1B:
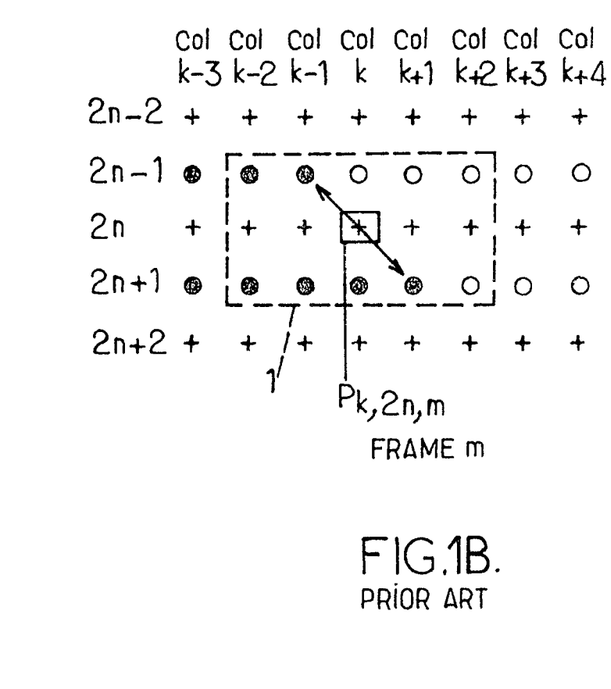

FIGS. 1A and 1B represent two examples of successive frames. A frame (m−1) of the first type, represented partially in FIG. 1A, precedes in time a frame m of the second type, represented partially in FIG. 1B. Frame (m−1) of a first type and frame m of a second type are respectively associated with two successive images.

Each frame comprises columns, indexed by the letter k, and lines, indexed by the letter n. Each frame comprises only half the pixels of the associated image. Frame (m−1) of the first type, for example even, comprises only lines of pixels of a first type, for example even lines (lines 2n), where n is an integer. Frame m of a second type, for example odd, comprises only lines of pixels of a second type, for example odd lines (lines (2n+1)). The missing lines of an even frame are the odd lines, and vice versa. The lines present in an even frame are the even lines, and vice versa.

There exist numerous methods of converting the "interlaced" display format to the natural format termed "progressive" or "sequential" where the totality of the lines is coded for each image. This conversion is known by the name deinterlacing. The goal is to reconstruct on the basis of a sequence of interlaced source images a sequence of progressive images of visual quality that is as close as possible to the sequence of source images before interlacing.

The conversion of the interlaced format to the progressive format necessitates interpolating the missing lines for each frame, that is to say the even lines for the odd frames and the odd lines for the even frames. The reconstruction of the pixels of the missing lines must make it possible to obtain a sequence of images of the best possible quality.

The interpolation of the missing lines of a given frame can be performed on the basis of the lines present in this frame: we will speak of spatial interpolation. For example, the value of the pixel $P_{k,2n,m}$ situated in column k and in line 2n of frame m represented in FIG. 1B can be calculated on the basis of the values of the pixels of the line above (2n−1) and of the line below (2n+1) in frame m.

The interpolation can also be temporal, that is to say the values of the pixels of a previous frame and/or of a following frame can be used to evaluate the values of the pixels of the missing lines of a given frame. A purely temporal interpolation is for example used when the image sequence is in the "movie" format. For example, the value of the pixel $P_{k,2n,m}$ situated in column k and in line 2n of frame m represented in FIG. 1B can be chosen to be equal to the value of the pixel $P_{k,2n,m-1}$ situated in column k and in line 2n of frame (m−1) represented in FIG. 1A.

An interpolation method can also comprise a spatio-temporal interpolation, that is to say the evaluation of the value of a pixel of a missing line of a given frame is performed on the basis of the values of the pixels of lines present in the given frame, on the one hand, and on the basis of the values of the pixels of a previous frame and/or of a following frame on the other hand. Among the spatio-temporal methods of interpolation may be cited by way of example median filtering.

Interpolation methods can also comprise methods with motion compensation.

Spatial interpolation is widely used, in particular in methods of spatial or spatio-temporal interpolation.

A relatively simple method of spatial interpolation consists in choosing as value of a pixel $P_{k,2n,m}$ of a column k and of a line 2n a mean of the values of the pixels $P_{k,2n-1,m}$ and $P_{k,2n+1,m}$ belonging to the same column k and to the lines present (2n−1) and (2n+1) which flank the missing line 2n. The interpolation is performed in a vertical direction. However, when the image associated with frame m represents shapes with diagonal contours, a vertical interpolation is at risk of leading to the appearance of staircasing at the level of the diagonal contours.

Figure 2:
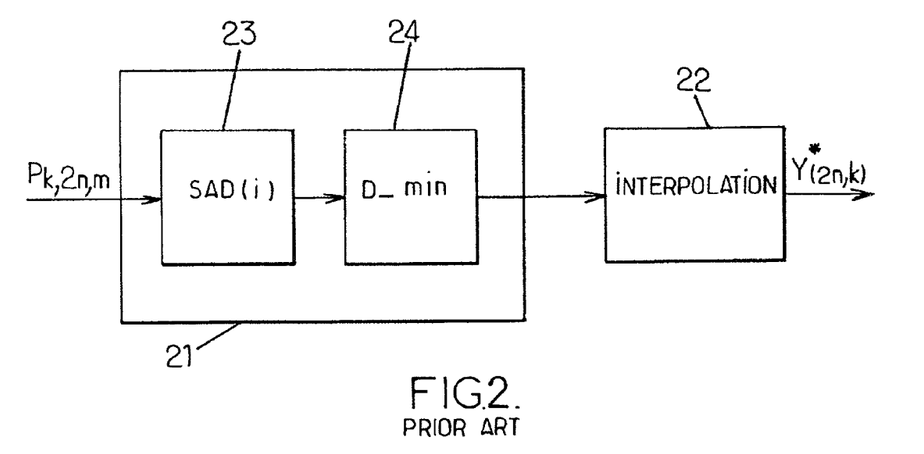
FIG. 2, also already commented on, represents an exemplary algorithm for evaluating the value of a pixel according to the prior art.

In order to remedy this drawback, it is known to perform a diagonal interpolation. FIG. 2 represents an example of a diagonal interpolation algorithm for the evaluation of the value of a given pixel $P_{k,2n,m}$ of a missing line 2n of a frame m. A direction of interpolation is estimated (step 21), conventionally by calculating a score for each direction Di indexed by the letter i of a set of directions (step 23) and by choosing the direction D_min for which the associated score is the lowest as direction of interpolation. The algorithm also comprises an interpolation step (step 22) based on the values of the pixels aligned along the direction of interpolation to evaluate the value Y*(2n,k) of the pixel $P_{k,2n,m}$.

European Patent EP 1 450 560 describes an exemplary algorithm for searching for the best direction. The search is performed within a window of ten pixels around the pixel whose value is to be evaluated. This window is referenced 1 in FIG. 1B. Seven directions are considered and indexed by the letter i, where i varies between 0 and 6:

a direction substantially at −63° relative to a vertical direction, and in the trigonometric sense, for which i=0,
a direction substantially at −45°, for which i=1,
a direction substantially at −26°, for which i=2, the vertical direction, for which i=3,
a direction substantially at 26°, for which i=4,
a direction substantially at 45°, for which i=5, and
a direction substantially at 63°, for which i=6.

For each direction considered, there is calculated a weighted sum of the absolute differences of the values of pixels ("Sum of Absolute Differences" or SAD).

To return to the frame example illustrated by FIG. 1B, for the vertical direction (i.e. for i=3), the weighted sum SAD(3) can be calculated using the formula:

$$SAD(3) = 0.125 * |Y(2n-1, k-1) - Y(2n+1, k-1)| +$$
$$0.75 * |Y(2n-1, k) - Y(2n+1, k)| +$$
$$0.125 * |Y(2n-1, k+1) - Y(2n+1, k+1)|,$$

where Y(2n, k) designates the value of the pixel $P_{k,2n,m}$.

For a direction at +45° in the trigonometric sense and relative to the vertical direction, (i.e. i=5), the weighted sum SAD(5) can be calculated using the formula:

$$SAD(5) = 0.3125 * |Y(2n-1, k-2) - Y(2n+1, k)| +$$
$$0.375 * |Y(2n-1, k-1) - Y(2n+1, k+1)| +$$
$$0.3125 * |Y(2n-1, k) - Y(2n+1, k+2)|.$$

For a given direction, each difference is in fact computed between two pixels aligned along this direction. By choosing the lowest weighted sum, from among the weighted sums SAD(i) calculated, it is possible to estimate the direction for which the modifications of values of the pixels between the line above and the line below are minimal, that is to say the direction of the contour at the level of this pixel.

Such an algorithm can for example be applied to search for the direction of interpolation corresponding to the pixel $P_{k,2n,m}$ of the frame represented in FIG. 1B. For the sake of simplification, we consider that the pixels represented in this frame can take only two values, corresponding for example to the color black and to the color white. This algorithm leads to selecting the direction at 45°, represented by a double arrow in FIG. 1B.

Once the direction of interpolation has been thus estimated for a given pixel, the value of this pixel can be interpolated with the aid of the values of the pixels aligned along this direction, here the pixels $P_{k-1,2n-1,m}$ and $P_{k+1,2n+1,m}$. In this simplified example, the evaluated value of the pixel $P_{k,2n,m}$ corresponds to the color black.

However, algorithms for searching for the direction of interpolation can lead to an indeterminacy or to a wrong result, in particular for images exhibiting objects of relatively small thickness.

Figure 3:
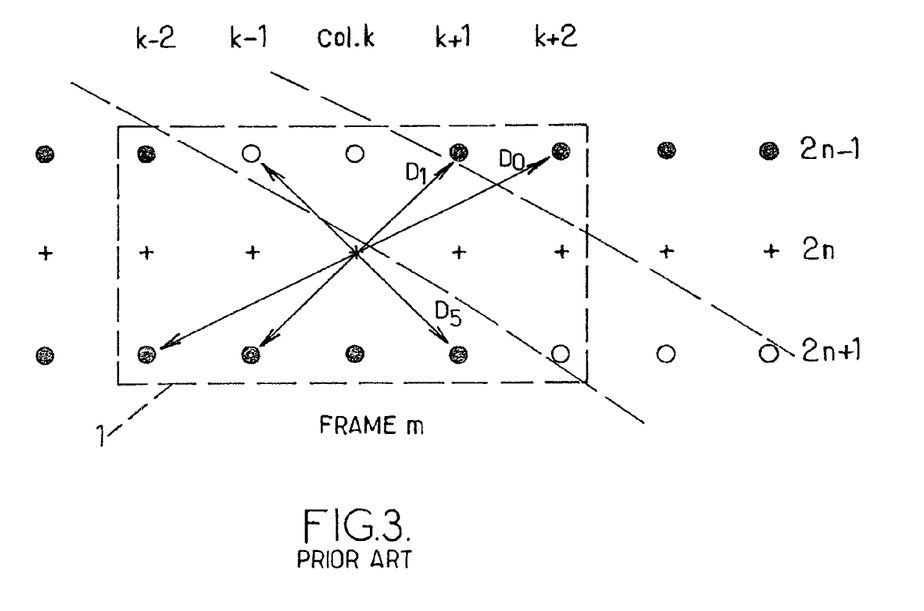
FIG. 3, also already commented on, represents an exemplary portion of frame and directions of interpolation obtained with an algorithm for estimating direction of interpolation according to the prior art.

FIG. 3 illustrates an exemplary odd frame associated with an image representing an object of relatively small thickness. The thickness of the object, whose contours are represented by dashed lines, is of course relative to the number of pixels.

The algorithm described in European Patent EP 1 450 560 leads to selecting the direction $D_0$, associated with an angle of about −63° relative to the vertical direction of the columns, as direction of interpolation corresponding to the pixel $P_{k,2n,m}$. The weighted sums SAD(1) and SAD(5) associated with the directions $D_1$ and $D_5$, respectively −45° and +45° relative to the vertical direction, are also relatively small.

Other known algorithms for searching for the direction of interpolation can also culminate in a wrong result, or else in an indeterminacy between mutually very different directions.

Accordingly, what is needed is a method and an apparatus to determine the direction of interpolation with greater reliability.

SUMMARY OF THE INVENTION

The present invention determines the direction of interpolation with greater reliability. The present invention provides a device and a method of deinterlacing a sequence of moving images from an interlaced format to a progressive format. The sequence of images is composed of successive frames. The method comprises, for a plurality of pixels of missing lines of a current frame to be completed, an evaluation of the values of these pixels according to a spatially consistent order. The evaluation comprises, for each pixel of the plurality of pixels, estimating a direction of interpolation, and spatial interpolation according to the estimated direction of interpolation. The estimation step comprises, for at least one current pixel of the plurality of pixels, calculating a score for at least two directions, and selecting the direction of interpolation on the basis of the calculated scores and of the estimated direction of interpolation for a distinct pixel situated in the neighborhood of the current pixel. The selecting comprises comparing two of the calculated scores between them. The vertical direction is selected as the direction of interpolation if the comparison shows enough closeness between the two compared scores.

The expression "spatially consistent order" is understood to mean an order according to which there exists a priori some correlation between the values of two consecutive pixels, having regard to the content of the image. Neighborhood of the current pixel is understood to mean the pixels adjacent to this pixel where situated in a window of pixels around this pixel whose size is small enough for it to be possible to consider that there is some correlation between the values of these pixels. This definition may manifest itself differently according to the nature of the images.

The direction of interpolation varies in fact relatively little for neighboring pixels. By using the estimated direction of interpolation for a distinct pixel situated in a neighborhood of the current pixel, it is possible to avoid a wrong choice of the estimated direction of interpolation.

In an embodiment, the evaluation of the values of the pixels of the plurality of pixels is effected missing line by missing line, and, within a given missing line, from left to right. Such a mode of processing is commonly used in deinterlacing, so that the implementation of the method of the invention can be effected relatively easily on the basis of existing deinterlacing algorithms or programs. Moreover, for each current pixel, the corresponding distinct pixel can belong to the same line, and to an adjacent column to the left of the column of the current pixel, that is to say the distinct pixel is in fact the pixel processed immediately before the current pixel. The algorithm corresponding to the method of the invention is thus relatively simple. The method can for example comprise storing the estimated direction of interpolation: the direction of interpolation stored can thereafter be used to estimate the direction of interpolation of another current pixel, for example the pixel processed immediately after.

The subject of the present invention is also a device for deinterlacing a sequence of images from an interlaced format to a progressive format, the sequence of images being composed of successive frames. The deinterlacing device comprises an evaluation device for evaluating, according to a spatially consistent order, the value of at least one current pixel belonging to a missing line of a current frame. The evaluation device comprises a first memory for storing at least the values of pixels of a window around the current pixel. A calculation device makes it possible to calculate and store a score for at least two directions for the current pixel on the basis of the stored values of the pixels. A second memory makes it possible to store an indication as regards an estimated direction of interpolation for a pixel distinct from the current pixel, the distinct pixel being situated in a neighborhood of the current pixel. A selection device makes it possible to select a direction of interpolation for the current pixel on the basis of the calculated scores and of the estimated direction of interpolation stored in the second memory. The selection device comprises comparing means to compare two of the calculated scores between them. The vertical direction is selected as the direction of interpolation if the comparison shows that the compared scores are close enough one to the other. An interpolation device makes it possible to spatially interpolate the value of the current pixel in the selected direction of interpolation.

Embodiments of this device make it possible to employ implementations of the method presented above. The estimated direction of interpolation for one or more pixels situated in the neighborhood of the current pixel makes it possible to facilitate decision taking as regards the direction of interpolation of the current pixel.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention will be apparent from the following detailed description taken in conjunction with the accompanying drawings in which:

Other features and advantages of the present invention will appear in the description hereafter.

DESCRIPTION OF THE PREFERRED EMBODIMENTS

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

Figure 4:
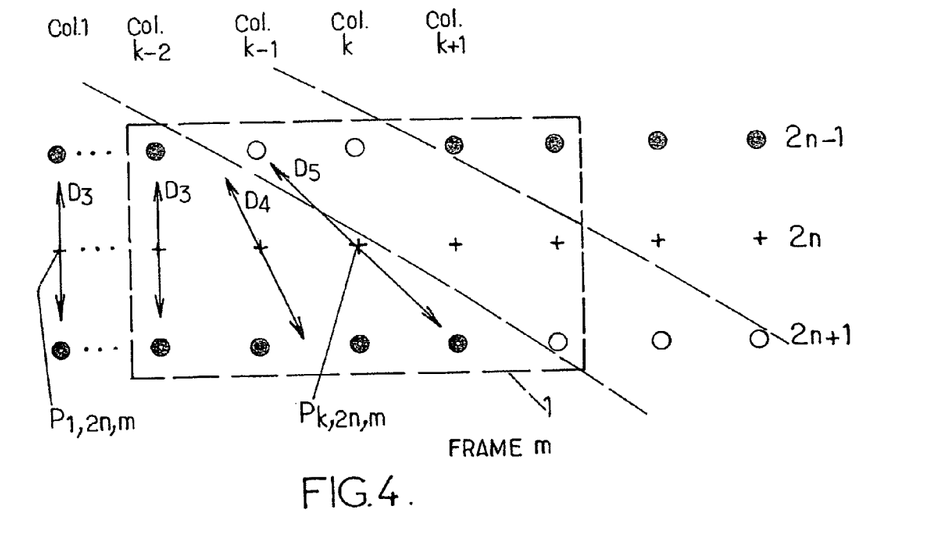
FIG. 4 shows an exemplary portion of frame and directions of interpolation obtained with an algorithm for estimating direction of interpolation according to a preferred embodiment of the present invention.

We refer first of all to FIG. 4, in which is represented a frame portion, associated with an image representing an object of relatively small thickness. The thickness of the object, whose contours are represented by dashed lines, is of course relative to the number of pixels.

For the sake of simplification, the pixels represented in this frame can take only two values, corresponding for example to the color black and to the color white. In practice, however, intermediate values are possible.

Frame m represented comprises columns, indexed by the letter k, and lines, indexed by the letter n. The frame m represented is an odd frame.

The pixel values of a plurality of pixels of missing lines are evaluated. In the preferred embodiment, the plurality of pixels comprises all the pixels of the missing lines.

Brief Presentation of the Algorithm

In the preferred embodiment, the evaluation of the values of the pixels is effected according to an order corresponding for example to an order of display, that is to say missing line by missing line starting from the top, and within a given missing line, from left to right.

Each missing line comprises a first pixel $P_{1,2n,m}$ situated at the left end of the missing line. The value of this first pixel $P_{1,2n,m}$ is evaluated according to a vertical interpolation method (not represented). The other pixels of each missing line are current pixels, for which the method represented in FIG. 5 can be applied.

Figure 5:
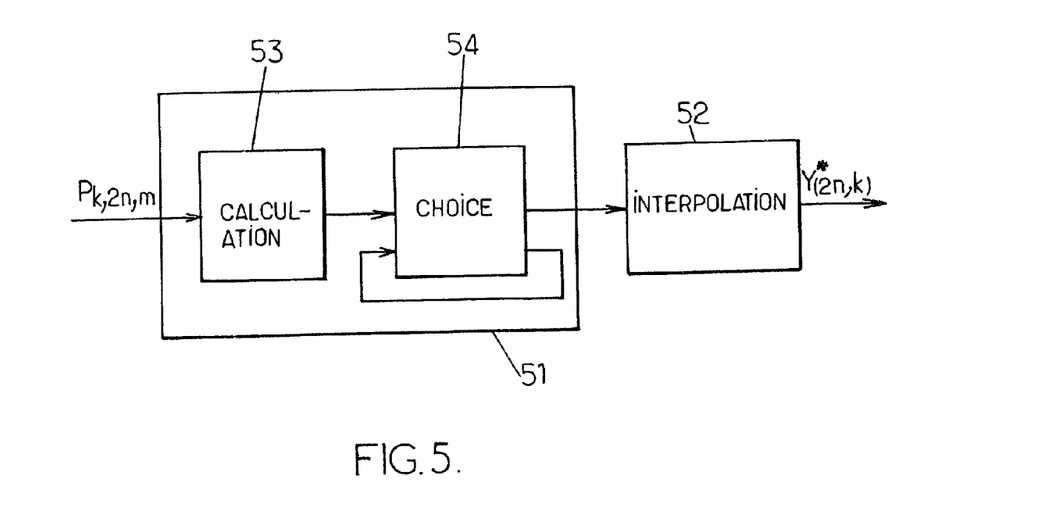
FIG. 5 represents a simplified exemplary algorithm for evaluating the value of a current pixel according to the preferred embodiment of the present invention.

For each current pixel $P_{k,2n,m}$, a direction of interpolation is estimated (step 51). The estimation of the direction of interpolation comprises a step 53 of calculating a score for at least two directions, here for each direction indexed by the letter i of a set of directions. A method such as that described in document EP 1 450 560 can be used for this purpose. The score is then a weighted sum of absolute values of differences (SAD) of values of pixels of a window 1 around the current pixel $P_{k,2n,m}$. The invention is of course not limited by the algorithm chosen for performing the calculation step 53.

The estimation of the direction of interpolation also comprises a step 54 of selecting the direction of interpolation for the current pixel, not only on the basis of the scores SAD(i) calculated, but also on the basis of the estimated direction of interpolation for a distinct pixel $P_{k-1,2n,m}$. The distinct pixel is here chosen from among the pixels of the same missing line as the current pixel, and of an adjacent column, to the left. Thus, when the evaluation of the values of the pixels is effected according to the order defined above, the distinct pixel is that whose value has just been evaluated.

To return to the example illustrated by FIG. 4, and supposing that the estimation of the direction of interpolation for the distinct pixel $P_{k-1,2n,m}$ leads to selecting the direction $D_4$, this direction is taken into account during the selection of the direction of interpolation for the current pixel $P_{k,2n,m}$. We saw previously that the calculation algorithm described in document EP 1 450 560 led, for the current pixel $P_{k,2n,m}$, to making a choice from among the directions $D_0$, $D_1$ and $D_5$. The method according to the present invention, by using the estimated direction of interpolation $D_4$ for the distinct pixel $P_{k-1,2n,m}$, makes it possible to identify in a relatively reliable way the direction $D_5$ as being the correct direction of interpolation. The directions of interpolation on the approach to a contour vary in fact in a relatively continuous way since a whole window of pixels is taken into account for calculating the scores.

To return to FIG. 5, once the direction of interpolation has been estimated for the current pixel, the value Y*(2n,k) of the current pixel $P_{k,2n,m}$ is evaluated by spatial interpolation in the estimated direction of interpolation (step 52).

The algorithm illustrated by FIG. 5 is, in the preferred embodiment, applied to all the pixels of a given missing line starting from the second on the left. For this second pixel adjacent to the first pixel, the direction of interpolation is also selected on the basis of the values of the calculated scores and of the estimated direction of interpolation for the first pixel. The direction of interpolation of the first pixel is considered by default as being the vertical direction. Initializing the algorithm is thus relatively simple to implement. Moreover, an image frequently comprises relatively plain zones. The directions of interpolation of the pixels in such zones are mostly vertical.

More Detailed Presentation of the Algorithm

Figure 6:
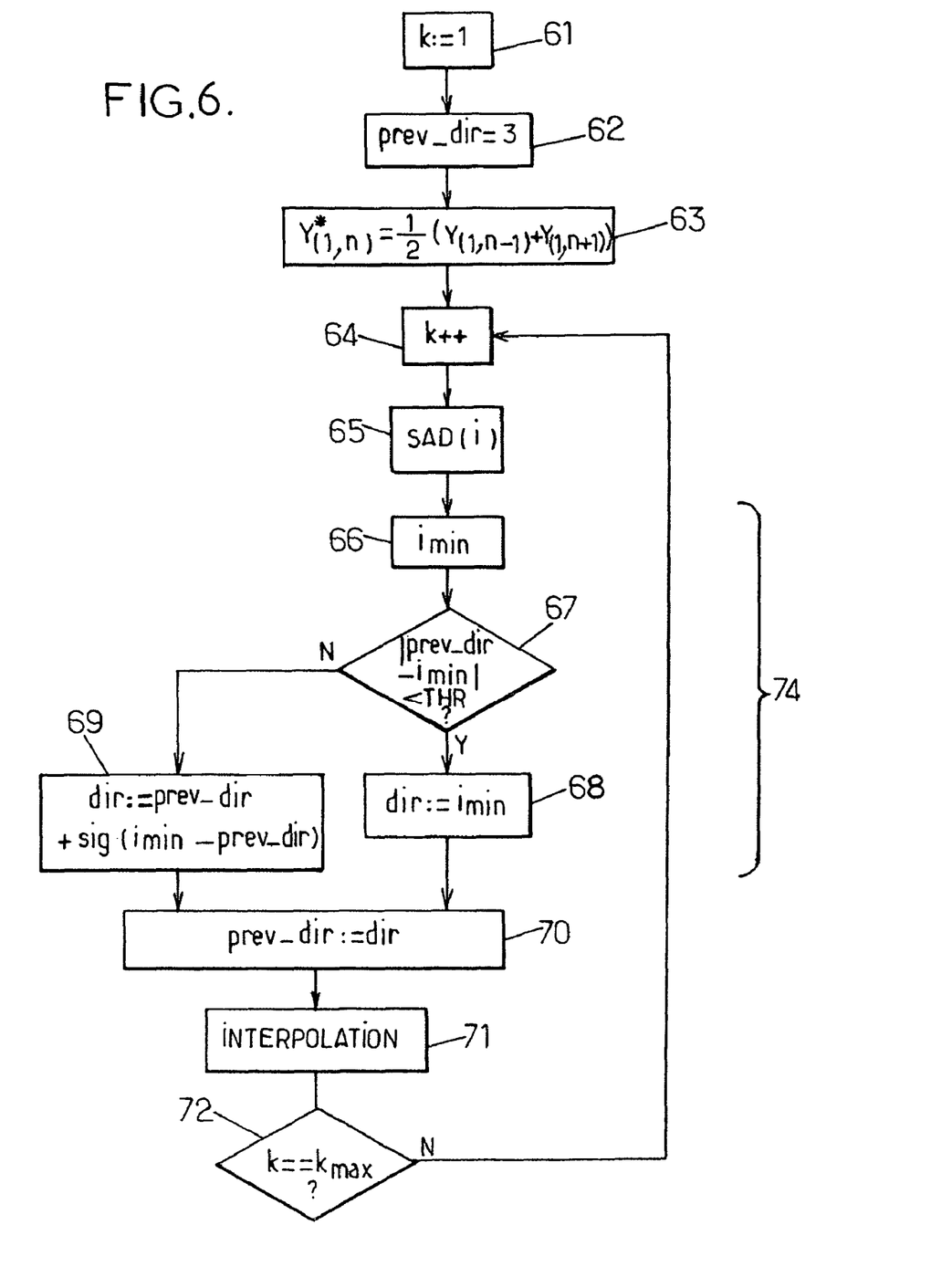
FIG. 6 represents a detailed exemplary algorithm for evaluating the values of pixels of a missing line according to the preferred embodiment of the present invention.

FIG. 6 represents a detailed example of an algorithm for evaluating the values of pixels of a missing line according to the preferred embodiment of the present invention. We assume in this example that the integer n is even.

In the preferred embodiment, each pixel of the missing line is processed from left to right. The index k is first of all initialized (step 61) so as to consider the first pixel $P_{1,n}$. The direction of interpolation for this first pixel is initialized as being vertical, and a first variable prev_dir then takes the value 3 indicative of the vertical direction (step 62).

The value of the first pixel $P_{1,n}$ is estimated (step 63) according to a vertical interpolation, doing so, in the preferred embodiment, on the basis of only two pixels.

The values of the other pixels of the missing line to be processed, termed current pixels, are then evaluated. The algorithm can comprise a loop on the index of the columns k, with conventional steps of testing (step 72) on the value of the index k and of incrementation (step 64) of the value of the index k.

For a given value of the index k given, that is to say for a given pixel, a score is calculated over a set of directions (step 65) indexed by the letter i. Here, the score is a weighted sum (SAD). This step can be implemented by a loop over the directions of the direction set, not represented in FIG. 6.

The method also comprises a selection step 74 for selecting the direction of interpolation, represented in a more detailed manner. In this example, the selecting step 74 comprises choosing the lowest score from among the set of calculated scores (step 66). To this lowest score corresponds a provisional direction D_min and an index $i_{min}$. The index $i_{min}$ of the provisional direction D_min is, in the preferred embodiment, compared with the value of the first variable prev_dir. More exactly, the absolute value of the difference between the value $i_{min}$ indexing the provisional direction and the first variable prev_dir is compared with a threshold THR. The direction of interpolation for the current pixel is determined according to a result of the comparison (step 68 or 69).

If the value $i_{min}$ indexing the provisional direction differs overly from the value of the first variable prev_dir, the direction of interpolation of this current pixel is estimated (step 69) as being equal to the estimated direction of interpolation for the distinct pixel. In the example illustrated, a second variable dir indicating the direction of interpolation of this current pixel is estimated as equal to the first variable prev_dir plus or minus a unit according to the sign of the difference between the value $i_{min}$ indexing the provisional direction and the first variable prev_dir.

If between the value $i_{min}$ indexing the provisional direction differs relatively little from the value of the first variable prev_dir, the direction of interpolation of this current pixel is estimated (step 68) as equal to the provisional direction.

To return to the example of the frame represented in FIGS. 3 and 4, when step 65 of calculating the scores is performed using the algorithm described in the document EP 1 450 560, the step 66 of choosing the lowest score from among the set of calculated scores leads to choosing the direction $D_0$ as provisional direction, i.e. $i_{min}=0$.

It will be supposed that the method according to the present invention leads to estimating the direction of interpolation of the distinct pixel $P_{k-1,2n,m}$ as being the direction $D_4$, i.e. prev_dir=4.

The threshold can for example have a value equal to 1.

The absolute value of the difference between the value $i_{min}$ indexing the provisional direction and the first variable prev_dir is equal to 4. The second variable dir indicating the selected direction of interpolation is hence equal to 3, this corresponding to the vertical direction. The method illustrated in FIG. 6 thus makes it possible to limit the estimation errors.

According to an alternative embodiment, the choosing step 66 leads to a set of provisional directions possibly comprising several provisional directions. Each provisional direction is thereafter compared with the estimated direction so as to determine the most relevant provisional direction. In the case of the frame represented in FIGS. 3 and 4, and for the current pixel $P_{k,2n,m}$, this embodiment leads to selecting the direction $D_5$ as estimated direction of interpolation.

The value of the second variable dir indicating the estimated direction of interpolation for the current pixel can be stored (step 70). The value of the second variable dir is in fact assigned to the first variable prev_dir in anticipation of the next execution of the loop indexed k.

The value of the current pixel is thereafter determined (step 71) by spatial interpolation along the direction of interpolation.

The test step 72 makes it possible to avoid an execution of the loop when the last current pixel of the missing line has been processed. The algorithm can then go to the following missing line, or to the following frame.

The method can moreover comprise a few additional steps, not represented, for refining the estimation of the direction of interpolation for the current pixel.

For example, the set of scores calculated during the calculation step 65 can be sorted in ascending order to identify the value of the lowest score and the value of the highest score. If the difference between the value of the lowest score and the value of the highest score is less than a second threshold, it can be estimated that the corresponding zone of the image is relatively plain, that is to say it exhibits few contours. Accordingly, the direction of interpolation for the current pixel can then be estimated to be equal to the vertical direction.

The difference between the value of the lowest score and the value of the score for the vertical direction can also be compared with a third threshold. If the value of the lowest score is relatively close to the value of the score for the vertical direction, the direction of interpolation for the current pixel can also be estimated to be equal to the vertical direction.

Other additional steps, for example steps for detecting horizontal contours, can also be implemented. These additional steps make it possible to evaluate the value of the current pixels in a yet more satisfactory manner.

Deinterlacing Device

Figure 7:
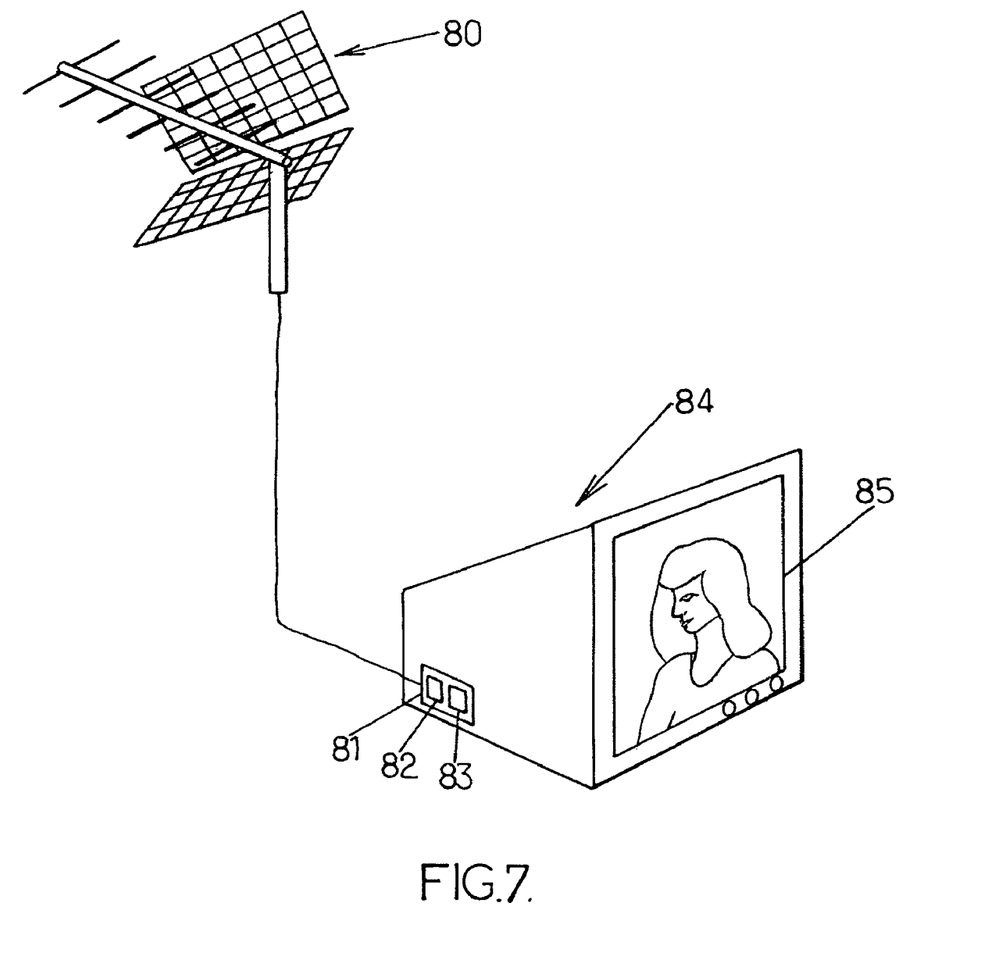
FIG. 7 represents an exemplary device according to an embodiment of the present invention.

FIG. 7 represents an exemplary device according to an embodiment of the present invention. The device represented comprises a television set 84 and a device for receiving successive frames, comprising for example an RF antenna 80. The device of the present invention can be used in a television set, as represented in FIG. 7, but also in other appliances, for example in a multimedia telephone ("smartphone").

The television set 84 comprises a screen 85 and an evaluation device 81.

The evaluation device 81, for example a control circuit, makes it possible to evaluate, according to a spatially consistent order, values of current pixels of missing lines of a captured current frame.

A first memory, by a memory RAM 82, makes it possible to store at least the values of pixels of a window around a current pixel. A calculation device, for example a DSP 83, makes it possible to calculate and to store a set of scores for the current pixel, each score corresponding to a direction. The DSP 83 communicates with the RAM 82 so as to be able to perform the calculation on the basis of the stored values of the pixels.

A second memory, here merged with the first memory 82, makes it possible to store an indication as regards an estimated direction of interpolation for a pixel distinct from the current pixel, for example a previously processed pixel situated in a neighborhood of the current pixel.

A selection device, here merged with the calculation device 83, makes it possible to choose a direction of interpolation for the current pixel on the basis of the calculated scores and of the estimated direction of interpolation which is stored in the second memory.

An interpolation device, here merged with the calculation device 83, makes it possible to spatially interpolate the value of the current pixel in the estimated direction of interpolation.

Alternative Embodiments

The present invention is not limited by the order in which the evaluation of the values of pixels is performed.

Neither is the invention limited by the position of the distinct pixel relative to the current pixel. For example, the distinct pixel corresponding to a given current pixel can belong to the same column, and to a line above the current pixel. The distinct pixel can be a pixel of a missing line or of a line that is present.

The evaluation of the values of the pixels applies at least to the pixels of the plurality of pixels. As described previously, the estimation step can be effected in an arbitrary manner for certain pixels of the plurality of pixels. The plurality of pixels can for example comprise a first pixel whose estimated direction of interpolation is the vertical direction, or any other direction.

The pixels of the missing lines might not belong entirely to the plurality of pixels. In particular, the first pixel of a given missing line might not belong to the plurality of pixels. For example, the value of the first pixel can be evaluated by a temporal interpolation and the direction of interpolation of the first pixel estimated using the value evaluated by temporal interpolation. This estimated direction of interpolation can subsequently be used according to the method of the present invention, for example to evaluate the value of a current pixel adjacent to the first pixel.

The term "current pixel" designates a pixel whose value is evaluated according to the method of the present invention, with an estimation step comprising a selection step based on the estimated direction of interpolation for the distinct pixel. The number of current pixels may be relatively limited. For example, the estimated direction of interpolation for the distinct pixel corresponding to a given current pixel may intervene only in case of indeterminacy following the calculation of the scores for the current pixel. In this case, the number of current pixels per frame depends on the frame and may be relatively small, or even zero according to the frame.

The step of storing the estimated direction of interpolation for a current pixel is optional, in particular when the values of part of the pixels of the missing lines of the current frame are evaluated following a different method from the method of the present invention.

Although a specific embodiment of the invention has been disclosed, it will be understood by those having skill in the art that changes can be made to this specific embodiment without departing from the spirit and scope of the invention. The scope of the invention is not to be restricted, therefore, to the specific embodiment, and it is intended that the appended claims cover any and all such applications, modifications, and embodiments within the scope of the present invention.

What is claimed is:

1. A method of deinterlacing a sequence of moving images from an interlaced format to a progressive format, the method comprising:
   receiving a sequence of images being composed of successive frames with a current frame comprising missing lines with a plurality of pixels to be completed;
   evaluating values for each of the plurality of pixels according to a spatially consistent order by estimating a direction of interpolation, and for at least one current pixel of the plurality of pixels,
     calculating a score for at least two directions of interpolation;
     selecting a direction of interpolation based on
       each score which has been calculated, and
       a previous direction of interpolation which has been estimated for a distinct pixel which has been selected from among the pixels of a same missing line as the current pixel and the distinct pixel has been processed immediately before the current pixel; and
   performing spatial interpolation according to the direction of interpolation which has been estimated.

2. The method of deinterlacing according to claim 1, wherein the selecting the direction of interpolation based on each score comprises comparing a lowest calculated score to a highest calculated score.

3. The method of deinterlacing according to claim 1, wherein the selecting the direction of interpolation based on each score comprises comparing a lowest calculated score to a calculated score corresponding to a vertical direction.

4. The method of deinterlacing according to claim 1, wherein the evaluating values of the plurality of pixels is performed missing line by missing line, and within a given missing line, from left to right for the plurality of pixel in the each of the missing lines.

5. The method of deinterlacing according to claim 4, wherein, for each current pixel ($P_{k,n}$), a corresponding distinct pixel ($P_{k-1,n}$) belongs to a same line, and to an adjacent column in a position which is left of the column of the current pixel.

6. The method of deinterlacing according to claim 5, wherein:
   for the given missing line with the plurality of pixels, the plurality of pixels comprises a first pixel ($P_{1,n}$) in a position situated at a left end of the missing line; and
   for each first pixel, the direction of interpolation which has been estimated is in a vertical direction.

7. The method of deinterlacing according to claim 1, wherein the selecting the direction of interpolation further comprises
   comparing the direction which has been chosen with the direction of interpolation which has been estimated for the distinct pixel.

8. The method of deinterlacing according to claim 2, wherein the selecting the direction of interpolation further comprises
   comparing the direction which has been chosen with the direction of interpolation which has been estimated for the distinct pixel.

9. The method of deinterlacing according to claim 3, wherein the selecting the direction of interpolation further comprises:
   choosing the direction based upon each score which has been calculated; and
   comparing the direction which has been chosen with the direction of interpolation which has been estimated for the distinct pixel.

10. The method of deinterlacing according to claim 4, wherein the selecting the direction of interpolation further comprises:
    choosing the direction based upon each score which has been calculated; and
    comparing the direction which has been chosen with the direction of interpolation which has been estimated for the distinct pixel.

11. The method of deinterlacing according to claim 5, wherein the selecting the direction of interpolation further comprises:
    choosing the direction based upon each score which has been calculated; and
    comparing the direction which has been chosen with the direction of interpolation which has been estimated for the distinct pixel.

12. The method of deinterlacing according to claim 6, wherein the selecting the direction of interpolation further comprises:
    choosing the direction based upon each score which has been calculated; and
    comparing the direction which has been chosen with the direction of interpolation which has been estimated for the distinct pixel.

13. The method of deinterlacing according to claim 1, comprising in addition, for each pixel of the plurality of pixels:
    storing the direction of interpolation which has been estimated for this pixel.

14. The method of deinterlacing according to claim 2, further comprising, for each pixel of the plurality of pixels:
    storing the direction of interpolation which has been estimated for this pixel.

15. The method of deinterlacing according to claim 3, comprising in addition, for each pixel of the plurality of pixels:
    storing the direction of interpolation which has been estimated for this pixel.

16. The method of deinterlacing according to claim 4, comprising in addition, for each pixel of the plurality of pixels:
    storing the direction of interpolation which has been estimated for this pixel.

17. The method of deinterlacing according to claim 5, comprising in addition, for each pixel of the plurality of pixels:
    storing the direction of interpolation which has been estimated for this pixel.

18. The method of deinterlacing according to claim 6, comprising in addition, for each pixel of the plurality of pixels:
    storing the direction of interpolation which has been estimated for this pixel.

19. An apparatus for deinterlacing a sequence of images from an interlaced format to a progressive format, the sequence of images being composed of successive frames, the apparatus comprising:
    an evaluation device for evaluating according to a spatially consistent order a value of at least one current pixel belonging to at least one missing line of a current frame with a plurality of pixels to be completed;
    a first memory for storing at least the value for each pixel in a window around the current pixel, which has been stored;
    a calculation device for calculating and storing a score for at least two directions for the current pixel based upon each value of the pixel which has been stored;
    a second memory for storing an indication of an estimated direction of interpolation for a pixel distinct from the current pixel, a distinct pixel being situated in a neighborhood of the current pixel;
    a selection device for selecting a direction of interpolation for the current pixel based on
        each value which have been calculated, and
        a previous direction of interpolation which has been estimated for a distinct pixel which has been selected from among the pixels of the missing line as the current pixel and the distinct pixel has been processed immediately before the current pixel; and
    an interpolation device for spatially interpolating the value of the current pixel in the direction of interpolation which has been selected.

20. A television set comprising:
    a screen; and
    a control circuit for deinterlacing a sequence of images from an interlaced format to a progressive format, the sequence of images being composed of successive frames, wherein the control circuit evaluates according to a spatially consistent order a value of at least one current pixel belonging to at least one missing line of a current frame with a plurality of pixels to be completed;
    a first memory for storing at least the value for each pixel in a window around the current pixel, which has been stored;
    a calculation device for calculating and storing a score for at least two directions for the current pixel based upon each value of the pixel which has been stored;
    a second memory for storing an indication of an estimated direction of interpolation for a pixel distinct from the current pixel, a distinct pixel being situated in a neighborhood of the current pixel;
    a selection device for selecting a direction of interpolation for the current pixel based on
        each value which have been calculated, and
        a previous direction of interpolation which has been estimated for a distinct pixel which has been selected from among the pixels of the missing line as the current pixel and the distinct pixel has been processed immediately before the current pixel; and
    an interpolation device for spatially interpolating the value of the current pixel in the direction of interpolation which has been selected.

* * * * *